(12) United States Patent
Jota

(10) Patent No.: US 12,309,494 B2
(45) Date of Patent: May 20, 2025

(54) IMAGE BLUR CORRECTION CONTROL APPARATUS AND CONTROL METHOD

(71) Applicant: CANON KABUSHIKI KAISHA, Tokyo (JP)

(72) Inventor: Yusuke Jota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 18/459,331

(22) Filed: Aug. 31, 2023

(65) Prior Publication Data

US 2024/0080562 A1    Mar. 7, 2024

(30) Foreign Application Priority Data

Sep. 2, 2022    (JP) ................................. 2022-139737

(51) Int. Cl.
  *H04N 23/68*    (2023.01)
(52) U.S. Cl.
  CPC ......... *H04N 23/687* (2023.01); *H04N 23/683* (2023.01)
(58) Field of Classification Search
  CPC .. H04N 23/687; H04N 23/683; H04N 23/663; H04N 23/6812
  See application file for complete search history.

(56) References Cited

U.S. PATENT DOCUMENTS

| | | | | |
|---|---|---|---|---|
| 11,431,904 B2* | 8/2022 | Hirama | ................. | H04N 23/683 |
| 2013/0342715 A1* | 12/2013 | Nakayama | ........... | H04N 23/683 348/208.11 |
| 2015/0042827 A1* | 2/2015 | Noguchi | .............. | H04N 23/667 348/208.2 |
| 2015/0271410 A1* | 9/2015 | Shintani | ............. | H04N 23/6812 348/208.4 |
| 2017/0155842 A1* | 6/2017 | Takayanagi | ........ | H04N 23/6811 |
| 2017/0251146 A1* | 8/2017 | Ikeda | ................... | H04N 23/687 |
| 2019/0052809 A1* | 2/2019 | Miyazawa | ......... | H04N 23/6812 |
| 2020/0084380 A1* | 3/2020 | Kuriyama | ........ | A61B 17/00234 |

FOREIGN PATENT DOCUMENTS

JP    6410431 B2    10/2018

* cited by examiner

*Primary Examiner* — Padma Haliyur
(74) *Attorney, Agent, or Firm* — Canon U.S.A., Inc. IP Division

(57) ABSTRACT

An apparatus for controlling a blur correction by driving first and second correction units, the first correction unit moving an optical element, the second correction unit moving a sensor, comprising a determination unit configured to determine a strength of the blur correction, a calculation unit configured to calculate a correction amount based on the strength and a shake amount, and a control unit configured to control the first and second correction units, wherein in a case where the control unit controls the first and second correction units by a first method, the determination unit determines the strength based on a position of the optical element, and in a case where the control unit controls the first and second correction units by a second method, the determination unit determines the strength based on a position of the sensor.

17 Claims, 7 Drawing Sheets

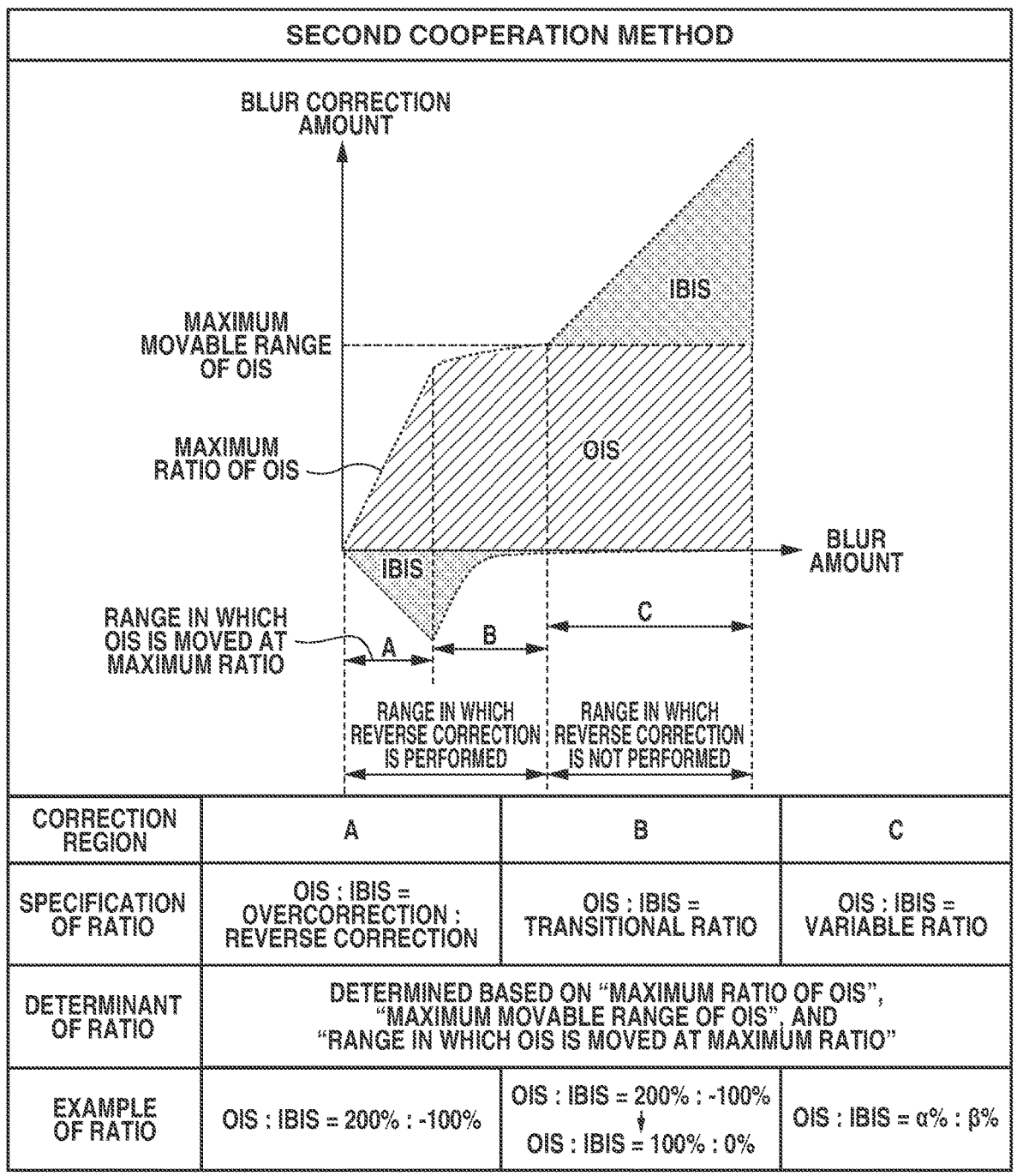

IMAGE BLUR CORRECTION CONTROL APPARATUS AND CONTROL METHOD

BACKGROUND

Technical Field

The aspect of the embodiments relates to an image blur correction control apparatus for use in an imaging apparatus, an imaging apparatus including the control apparatus, a lens apparatus including the control apparatus, and a control method therefor.

Description of the Related Art

Many of imaging apparatuses, such as digital cameras and video cameras, have recently been provided with an image blur correction function for correcting an image blur due to a shake or the like applied to the imaging apparatuses. This image blur correction function makes it possible to capture an image with a higher image quality.

The image blur correction mechanism used in imaging apparatuses as described above has two types, i.e., the type (hereinafter referred to as "Optical Image Stabilizer (OIS)") in which an image blur correction lens is shifted with respect to an optical axis of an imaging optical system to thereby reduce an image blur, and the type (hereinafter referred to as "In body Image Stabilizer (IBIS)") in which an image sensor is shifted with respect to the optical axis of the imaging optical system to thereby reduce an image blur.

Japanese Patent No. 6410431 discusses a technique in which these two types of image blur correction mechanisms are simultaneously driven to thereby increase a correctable blur angle (hereinafter referred to as an image blur correction angle).

SUMMARY

According to an aspect of the embodiments, an apparatus for controlling a blur correction by driving a first correction unit and a second correction unit, the first correction unit being configured to change a direction of an optical axis of an optical system by moving an optical element included in the optical system, the second correction unit being configured to move a sensor in a direction intersecting the optical axis, the sensor being configured to capture an object image formed by light having passed through the optical system, includes at least one processor which functions as a first obtaining unit configured to obtain positional information about the optical element, a second obtaining unit configured to obtain positional information about the sensor, a determination unit configured to determine a strength of the blur correction, a calculation unit configured to calculate a correction amount of at least one of the first correction unit and the second correction unit based on the determined strength of the blur correction and a shake amount of an imaging apparatus, and a control unit configured to control the first correction unit and the second correction unit by a plurality of methods including at least a first method and a second method, wherein in a case where the control unit controls the first correction unit and the second correction unit by the first method, the determination unit determines the strength of the blur correction based on the positional information about the optical element, and in a case where the control unit controls the first correction unit and the second correction unit by the second method, the determination unit determines the strength of the blur correction based on the positional information about the sensor.

Further features of the disclosure will become apparent from the following description of exemplary embodiments with reference to the attached drawings.

BRIEF DESCRIPTION OF THE DRAWINGS

FIG. 4 illustrates an example of a second cooperation method.

DESCRIPTION OF THE EMBODIMENTS

Figure 1:
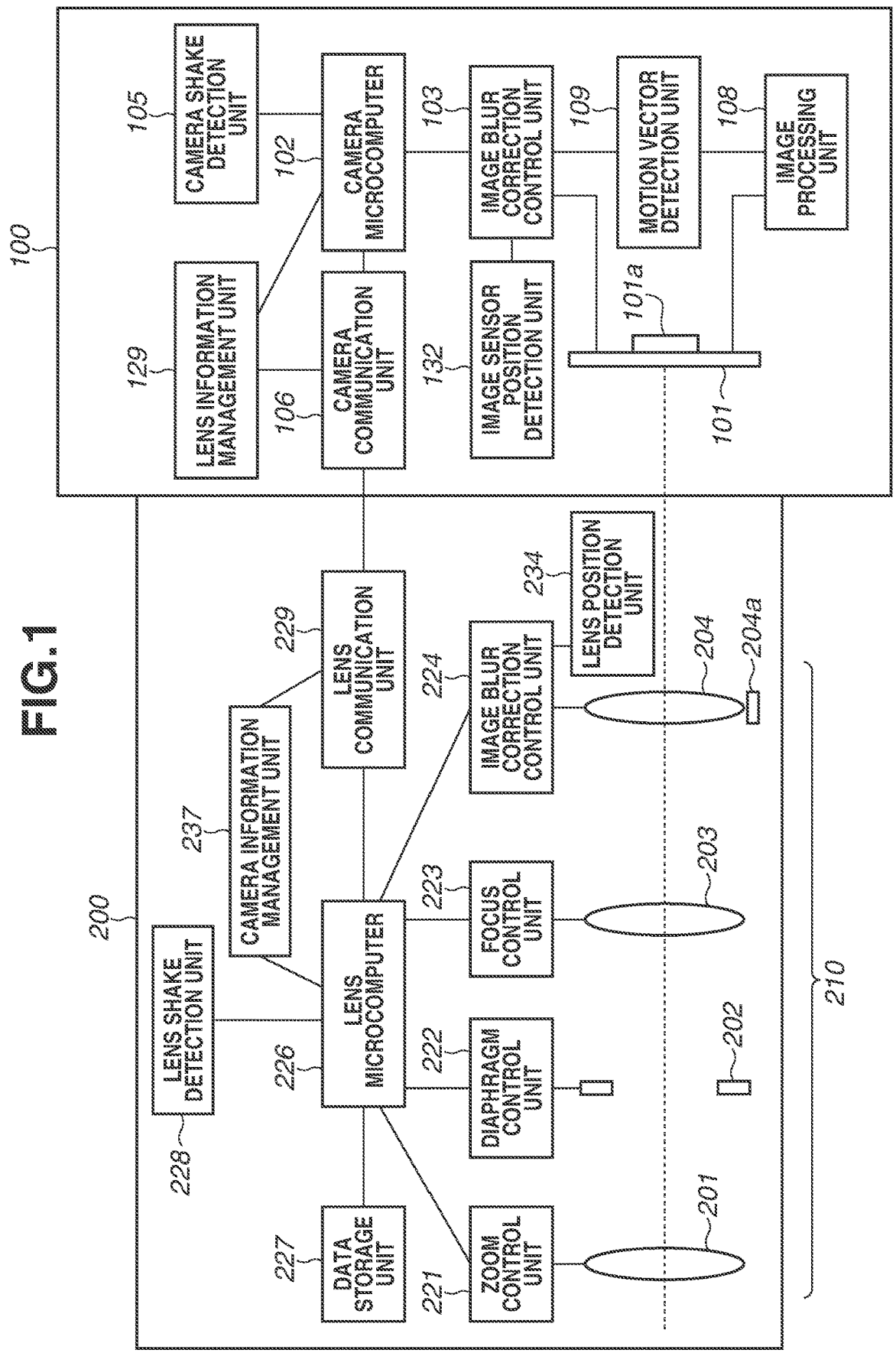
FIG. 1 is a block diagram illustrating a schematic configuration of an imaging system according to a first exemplary embodiment.

Exemplary embodiments will be described in detail below with reference to the attached drawings. The following exemplary embodiments are not meant to limit the scope of the disclosure. Multiple features are described in the exemplary embodiments, but limitation is not made to an invention that requires all such features, and multiple such features may be combined as appropriate. Further, in the attached drawings, the same reference numerals are given to the same or similar components, and redundant description thereof is omitted.

An amount of relative movement between an object image and an image sensor (a blur amount of the object image on an image) generated due to a movement of an imaging apparatus may vary depending on an image height. Thus, an optimum image blur correction may vary depending on the image height. For example, an image blur in a central portion with a low image height can be corrected, while an image blur in a peripheral portion with a high image height is noticeable in some cases.

Accordingly, in an exemplary embodiment of the disclosure, a control apparatus configured to appropriately reduce the effects of a blur even when the amount of blur to occur varies depending on the image height will be described. FIG. 1 is a block diagram illustrating a schematic configuration of an imaging system according to a first exemplary embodiment. The imaging system includes a camera body 100 and an interchangeable lens apparatus (hereinafter referred to as an "interchangeable lens") 200 that is detachably mounted on the camera body 100. The camera body 100 may be a still camera or a video camera. In the present exemplary embodiment, blur correction in the imaging system (so-called lens-interchangeable camera) in which the interchangeable lens 200 can be detachably mounted on the camera body 100 will be described.

Each component of the camera body 100 will now be described. An image sensor 101 is an image sensor such as a complementary metal-oxide-semiconductor (CMOS) image sensor, and captures an object image by photoelectrically converting the object image formed by light that has passed through an imaging optical system 210 included in the interchangeable lens 200. The image sensor 101 is configured to be movable in a direction intersecting an optical axis OP of the imaging optical system 210 by a shift mechanism 101*a*, and functions as an image blur correction unit (second image blur correction unit) using the image sensor 101 and the shift mechanism 101*a*. For example, the image sensor 101 is configured to be shifted within a plane orthogonal to the optical axis OP and to be rotated about the optical axis OP within the plane orthogonal to the optical axis OP. A configuration for shifting the image sensor 101 will be mainly described below by way of example. The shift mechanism 101*a* includes an actuator and enables the image sensor 101 to be shifted based on control of an image blur correction control unit 103 in the camera body 100. An output signal (hereinafter referred to as an imaging signal) from the image sensor 101 is input to an image processing unit 108.

The image processing unit 108 generates image data by performing various image processes on the received imaging signal. The image data is displayed on a monitor (not illustrated), or is recorded on a recording medium (not illustrated). The image data generated by the image processing unit 108 is output to a motion vector detection unit 109.

The motion vector detection unit 109 detects motion information about feature points in the image data as motion vectors using a plurality of pieces of image data (image data of a plurality of frames) generated at different image capturing timings in the image processing unit 108 by continuously performing image capturing in the image sensor 101. Any known method, such as a correlation method or a block matching method, can be used as the motion vector detection method, and thus the description of the detection method is omitted.

A camera shake detection unit 105 is composed of an inertial sensor such as an angular velocity sensor or an acceleration sensor, and detects a shake of the camera body 100 (hereinafter referred to as a "camera shake") caused due to a user's hand shake or the like. A camera shake detection signal is output as the detection result to the image blur correction control unit 103 via a camera microcomputer 102. In the present exemplary embodiment, a configuration example where the camera shake detection unit 105 is an angular velocity sensor and outputs an angular velocity signal as the camera shake detection signal will be described.

The camera microcomputer 102 controls the overall processing of the camera body 100. The camera microcomputer 102 can communicate with a lens microcomputer 226 via a camera communication unit 106 and a lens communication unit 229 in the interchangeable lens 200.

The camera communication unit 106 includes an electric contact and is connected to an electric contact included in the lens communication unit 229 in the mounted interchangeable lens 200, thereby establishing communication between the interchangeable lens 200 and the camera body 100.

A lens information management unit 129 holds and manages various pieces of information about the interchangeable lens 200 obtained through communication with the interchangeable lens 200 via the camera communication unit 106. The various pieces of information include optical characteristic information about the image blur correction lens included in the interchangeable lens 200, correction positional information about the image blur correction lens, and information about a movable range (upper limit of a driving amount).

The image blur correction control unit 103 in the camera body 100 functions as a control unit that controls the movement of the image sensor 101 to thereby control the IBIS. The image blur correction control unit 103 calculates a shift amount (target correction amount) of the image sensor 101 for reducing (correcting) an image blur caused due to a camera shake based on the camera shake detection signal detected by the camera shake detection unit 105. Further, the image blur correction control unit 103 controls the actuator included in the shift mechanism 101*a* based on the shift amount, thereby shifting and driving the image sensor 101 by the shift amount. This enables the object image to move on the image plane (sensor plane) of the image sensor 101, thereby making it possible to perform image blur correction (*IBIS*) by shifting the image sensor 101.

An image sensor position detection unit 132 is a position detection sensor, such as a Hall sensor, and detects the position of the image sensor 101 and outputs the detected position to the image blur correction control unit 103.

Each component of the interchangeable lens 200 will be described. The imaging optical system 210 includes a magnification lens 201, a diaphragm 202, a focus lens 203, and an image blur correction lens 204 that is an optical element configured to change a position where the object image is formed.

A zoom control unit 221 is configured to detect a position (hereinafter referred to as a "zoom position") of the magnification lens 201, and performs zooming by driving the magnification lens 201 in response to a zoom driving command from the camera microcomputer 102. Information about the zoom position is transmitted to the camera body 100 via the lens microcomputer 226 and the lens communication unit 229. The zoom position to be transmitted may be positional information about the magnification lens 201, or may be information about a focal length corresponding to the zoom position.

A diaphragm control unit 222 is configured to detect an aperture diameter of the diaphragm 202 (hereinafter referred to as a "diaphragm position"), and adjusts the light amount by driving the diaphragm 202 in response to a diaphragm driving command from the camera microcomputer 102. The diaphragm control unit 222 may continuously detect and control the diaphragm position, or may discontinuously detect and control the diaphragm position. For example, the diaphragm control unit 222 may detect an open state, a second level (intermediate), and a first level (minimum). Further, the diaphragm control unit 222 may detect the diaphragm position using the driving amount of a driving mechanism for driving the diaphragm 202. Information indicating the diaphragm position is transmitted to the camera body 100 via the lens microcomputer 226 and lens communication unit 229.

A focus control unit 223 is configured to detect a position of the focus lens 203 (hereinafter referred to as a "focus position") and performs focus adjustment by driving the focus lens 203 in response to a focus driving command from the camera microcomputer 102. Information indicating the focus position is transmitted to the camera body 100 via the lens microcomputer 226 and the lens communication unit 229.

The image blur correction lens 204 is configured to be shifted in a direction including a direction component orthogonal to the optical axis OP by a shift mechanism 204a, and the image blur correction lens 204 and the shift mechanism 204a function as an image blur correction unit (first image blur correction unit). Specifically, the image blur correction lens 204 is configured to be shifted within the plane orthogonal to the optical axis OP and to be rotated about a point on the optical axis OP. A configuration for shifting the image blur correction lens 204 will be mainly described below by way of example. The direction of the optical axis OP of the imaging optical system 210 is changed by shifting the image blur correction lens 204, and image blur correction is performed by moving the position of the object image formed on the image plane of the image sensor 101. The shift mechanism 204a includes an actuator and is configured to shift the image sensor 101 based on control of an image blur correction control unit 224 in the interchangeable lens 200.

A lens shake detection unit 228 is composed of an inertial sensor such as an angular velocity sensor or an acceleration sensor. The lens shake detection unit 228 detects a shake of the interchangeable lens 200 (hereinafter referred to as a "lens shake") caused due to a user's hand shake or the like, and outputs a lens shake detection signal representing the lens shake to the image blur correction control unit 224 via the lens microcomputer 226. If the interchangeable lens 200 is mounted on the camera body 100, the lens shake substantially matches the camera shake, and thus a shake detected by the lens shake detection unit 228 is also called a camera shake. In the present exemplary embodiment, a configuration example where the lens shake detection unit 228 is an angular velocity sensor and outputs an angular velocity as the lens shake detection signal will be described.

The image blur correction control unit 224 in the interchangeable lens 200 functions as a control unit that controls the movement of the correction lens 204 to thereby control the OIS. The image blur correction control unit 224 calculates a shift amount of the image blur correction lens 204 for reducing (correcting) an image blur caused due to a lens shake based on the lens shake detection signal detected by the lens shake detection unit 228. Further, the image blur correction control unit 224 controls the actuator included in the shift mechanism 204a based on the shift amount, thereby shifting and driving the image blur correction lens 204 by the calculated shift amount. This enables the image blur correction by shifting the image blur correction lens 204.

The image blur correction (IBIS) by shifting the image sensor 101 and the lens image blur correction (OIS) by shifting the image blur correction lens 204 as described above are generally called "optical image stabilization".

In the present exemplary embodiment, settings as to whether to execute optical image stabilization for image blur correction by shifting the image sensor 101 and optical image stabilization for image blur correction by shifting the lens can be independently made. The settings as to whether to execute the optical image stabilization may be made by the camera microcomputer 102 based on a user instruction, or may be automatically made based on various information such as the mode of the camera body 100.

A lens position detection unit 234 is a position detection sensor such as a Hall sensor. The lens position detection unit 234 detects the position of the image blur correction lens 204, and outputs the detected position to the image blur correction control unit 103.

The lens microcomputer 226 controls the overall processing of the interchangeable lens 200. The lens microcomputer 226 can communicate with the camera microcomputer 102 via the lens communication unit 229 and the camera communication unit 106 in the camera body 100. The lens microcomputer 226 also functions as a transmission control unit that reads out information such as image circle information to be described below stored in a data storage unit 227, and transmits the image circle information or the like to the camera body 100.

The lens communication unit 229 includes the electric contact and is connected to the electric contact included in the camera communication unit 106 of the camera body 100 on which the interchangeable lens 200 is mounted, thereby establishing communication between the interchangeable lens 200 and the camera body 100.

A camera information management unit 237 holds and manages various pieces of information about the camera body 100 obtained through communication with the camera body 100 via the lens communication unit 229. The various pieces of information include camera setting information, positional information about the image sensor 101, and movable range information.

The data storage unit 227 is a non-volatile storage unit, and stores optical information such as a zooming range (focal length variable range) of the imaging optical system 210, a focusing range (focal length range), and a variable range of an aperture value.

Figure 2:
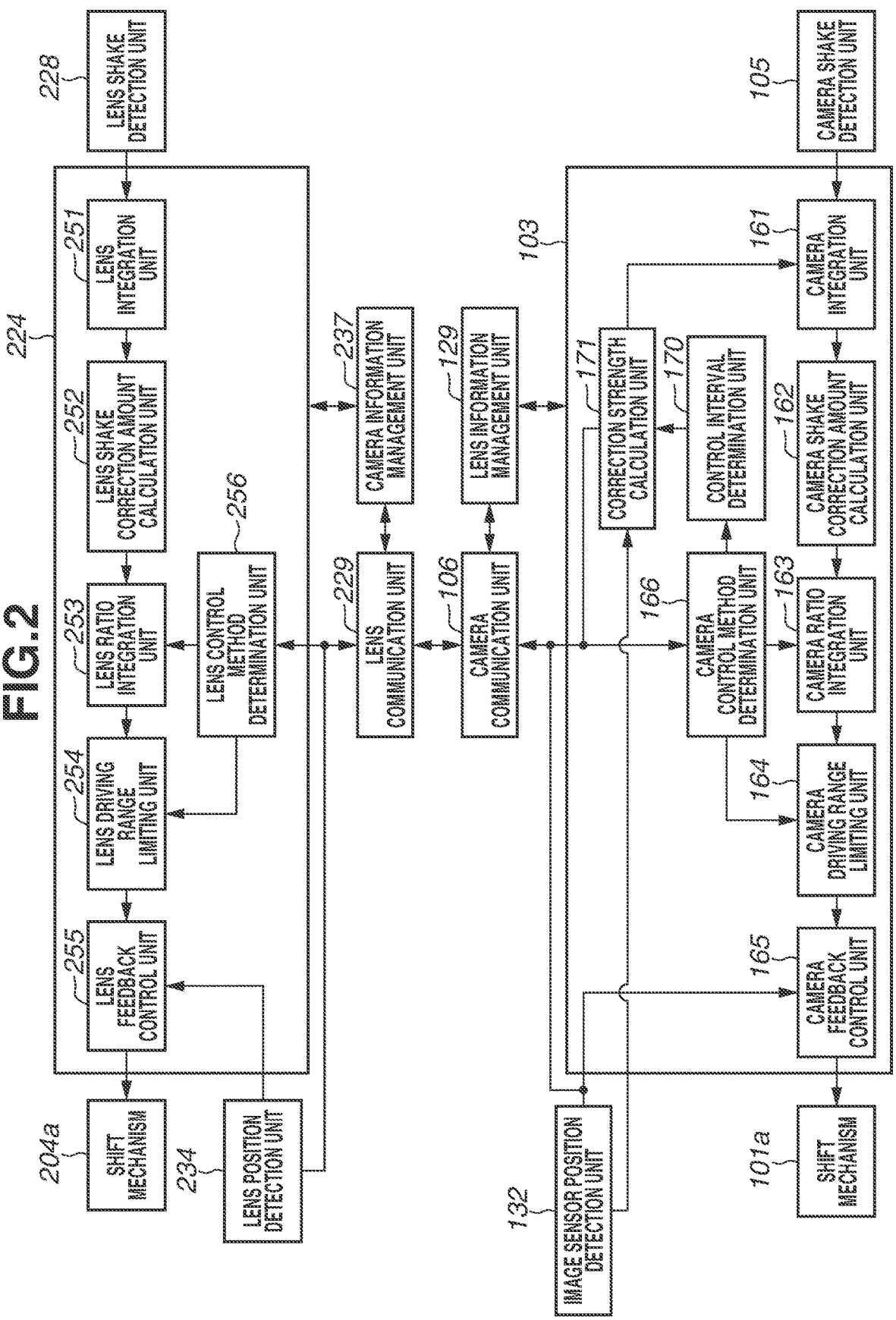
FIG. 2 is a block diagram illustrating a schematic configuration of an image blur correction control system for each of a camera and a lens according to the first exemplary embodiment.

FIG. 2 is a block diagram illustrating detailed configurations of the image blur correction control unit 103 in the camera body 100 and the image blur correction control unit 224 in the interchangeable lens 200. The configuration of the image blur correction control unit 103 in the camera body 100 will now be described.

The image blur correction control unit 103 in the camera body 100 receives an input of a blur angular velocity detection result as a shake detection signal from the camera shake detection unit 105. A camera integration unit 161 of the image blur correction control unit 103 in the camera body 100 performs integration processing on the input blur angular velocity, thereby converting the blur angular velocity into a blur angle. In the present exemplary embodiment, a pseudo integration low-pass filter (hereinafter referred to as an integration LPF) is used as the camera integration unit 161.

A camera blur correction amount calculation unit 162 calculates a correction amount for cancelling the blur angle in consideration of the frequency band of the converted blur angle and the drivable range of the camera body 100. Specific examples of the processing include band-pass filter processing for extracting only a specific frequency band to be subjected to the blur correction on an input blur angle signal.

A camera control method determination unit 166 determines which one of a first cooperation method and a second cooperation method is used to perform cooperation control for image blur correction using the camera body 100 (IBIS) and the interchangeable lens 200 (OIS) in cooperation. In the present exemplary embodiment, if at least one of the camera body 100 and the interchangeable lens 200 is not compatible with the second cooperation method, the first cooperation method is selected, and if both the camera body 100 and the interchangeable lens 200 are compatible with the second cooperation method, the second cooperation method is selected.

The first cooperation method and the second cooperation method will now be described with reference to FIGS. 3 and 4.

Figure 3:
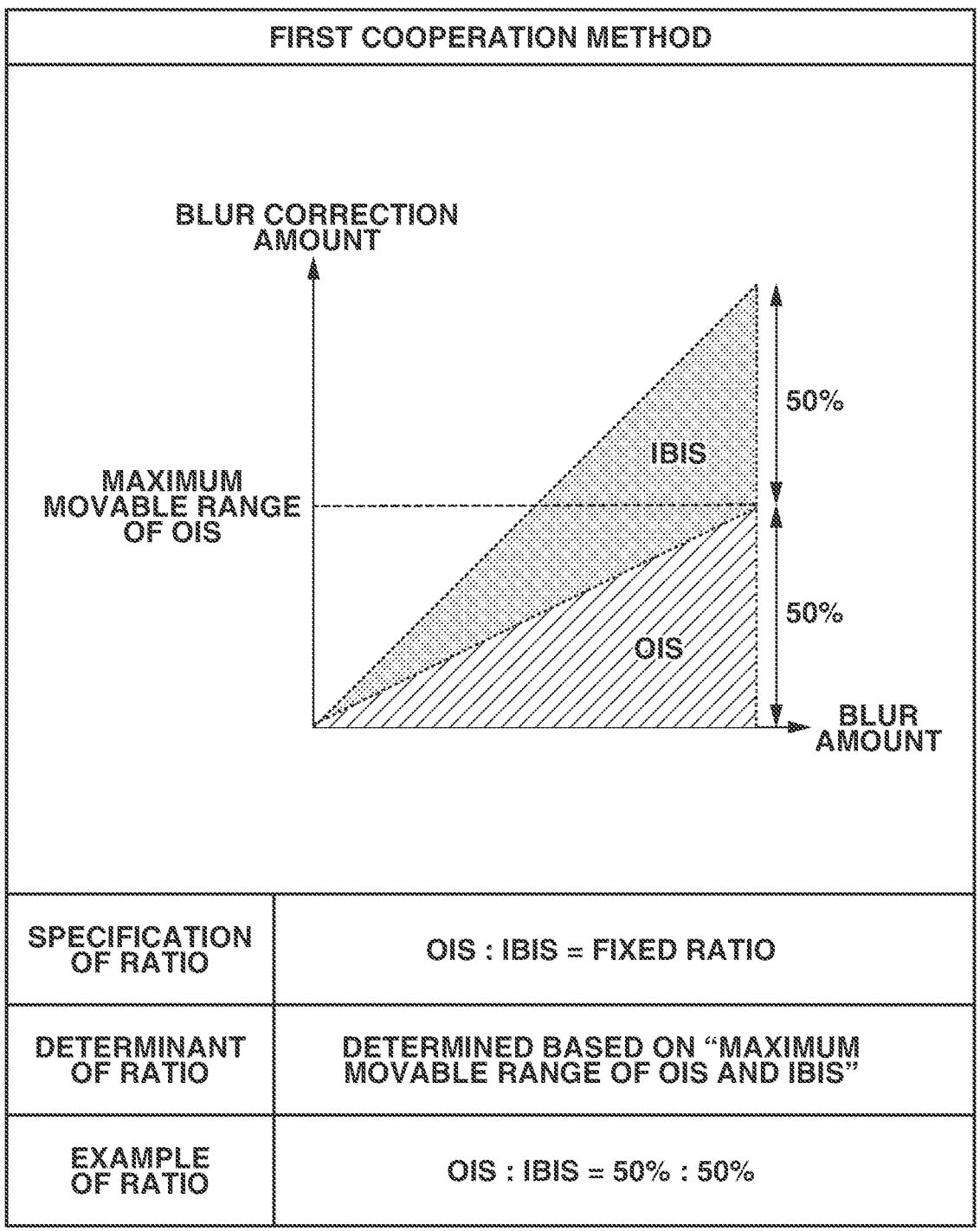
FIG. 3 illustrates an example of a first cooperation method.

FIG. 3 illustrates an example of the first cooperation method, and FIG. 4 illustrates an example of the second cooperation method.

In the graphs of FIGS. 3 and 4, the horizontal axis represents a blur amount detected by the camera shake detection unit 105 (output from the camera integration unit 161), and the vertical axis represents a blur correction amount. In the case of performing the blur correction, the remaining image blur can be eliminated by performing the correction by the same amount as the detected blur amount. Accordingly, in one embodiment, the blur amount may be set to be basically equal to the blur correction amount.

The first cooperation method will be described with reference to FIG. 3. In the first cooperation method, the ratio between the OIS and the IBIS is constant regardless of the blur amount, and the ratio increases until the blur correction amount for the OIS and the blur correction amount for the IBIS reach an end (upper limit) of the movable range of the OIS and an end (upper limit) of the movable range of the IBIS, respectively, along with an increase in the blur amount. This ratio is determined based on the size (length) of the movable range of each of the OIS and the IBIS.

The term "movable range" used herein does not indicate a distance at which the correction lens 204 or the image sensor 101 can be actually driven, but refers to a distance at which a relative movement between the object image and the image plane of the image sensor 101 can be generated by driving the correction lens 204 or the image sensor 101. FIG. 3 illustrates an example where the movable range of the OIS matches the movable range of the IBIS, and the correction ratio between the OIS and the IBIS is constantly 50%, regardless of the blur amount. In this case, the direction of the relative movement between the object image and the image plane of the image sensor 101 that is generated by the OIS matches the direction of the relative movement between the object image and the image plane of the image sensor 101 that is generated by the IBIS, and an image blur caused due to a hand shake is corrected using the OIS and the IBIS in cooperation. For example, in the case of using a correction lens that is configured such that the object image moves upward along with an upward movement of the correction lens, the OIS moves the object image downward at a timing when a hand shake occurs in the upward direction, and then moves the object image downward with respect to the image plane of the image sensor 101. In this case, the IBIS moves the object image upward, and then moves the object image downward with respect to the image plane of the image sensor 101 (in other words, the image plane is moved upward with respect to the object image). The method of moving the OIS and the IBIS so as to generate a relative movement therebetween in the same direction at the same ratio regardless of the blur amount is referred to as the first cooperation method. In this case, the blur correction amount for the OIS and the blur correction amount for the IBIS do not exceed the actually detected blur amount.

The second cooperation method will be described with reference to FIG. 4. According to the second cooperation method, the intervals (interval "A" and interval "B" in FIG. 4) in which the movable amount of the image blur correction lens 204 corresponding to the blur correction amount for correcting the generated blur amount is less than or equal to the length of the movable range of the image blur correction lens 204 (length from a reference position of the OIS and a movable end), the OIS is driven with a blur correction amount (excessive correction amount) that is more than the required correction amount for correcting the generated blur amount. In other words, the interval "A" and the interval "B" are intervals in which the generated blur amount can be corrected only by the OIS. The control for driving by the blur correction amount more than the required correction amount for correcting the generated blur amount is referred to as "overcorrection control". During this control, the IBIS performs reverse correction control so as to cancel an excess correction amount that is a correction amount more than the required correction amount for correcting the generated blur. In this case, the direction of a relative movement between the object image and the image plane of the image sensor 101 generated by the OIS is opposite to the direction of a relative movement between the object image and the image plane of the image sensor generated by the IBIS. The method in which overcorrection is performed by the OIS and the excess correction amount is cancelled by the IBIS is herein referred to as a first control method.

On the other hand, if the blur correction amount for correcting the generated blur amount exceeds the length of the movable range of the OIS and the generated blur cannot be corrected only by the OIS (interval "C"), the excess amount of blur that cannot be corrected by the OIS is corrected by the IBIS. In this case, the movement direction of the IBIS is a direction in which the movement of each of the object image and the image sensor 101 along with a shake that is currently occurring is reduced, and the movement direction matches the direction of a relative movement between the object image and the image plane of the image sensor 101 that is generated by the OIS and the IBIS.

As described above, the method of controlling a large blur that cannot be corrected only by the first control method such that the direction of a relative movement between the object image and the image plane of the image sensor 101 that is generated by the OIS matches the direction of a relative movement between the object image and the image plane of the image sensor 101 that is generate by the IBIS is herein referred to as a second control method. When a blur amount that exceeds the amount corresponding to a boundary between the interval "B" and the interval "C" is detected during control processing by the first control method (in other words, when the blur amount exceeds a predetermined value from a value less than or equal to the predetermined value), the control method is switched from the first control method in which the reverse correction is performed to the second control method in which the reverse correction is not performed. On the other hand, if a blur amount that is less than the amount corresponding to the boundary between the interval "B" and the interval "C is detected during control processing by the second control method, the control method is switched from the second control method in which the OIS and the IBIS perform the correction in the same direction to the first control method in which the reverse correction is performed.

Control processing on each interval will be described in detail. The interval "A" is an interval in which overcorrection control is performed by the OIS and reverse correction control is performed by the IBIS. Particularly, in the interval "A", the OIS is moved at a maximum ratio. In an example illustrated in FIG. 4, the maximum ratio is 200% and the correction amount that is twice as much as the correction amount required for correcting an image blur caused due to a hand shake. In this state, the overcorrection by the OIS causes an image blur, and thus the correction ratio for the IBIS is set to −100% and the sum of the correction ratio for the OIS and the correction ratio for the IBIS is set to 100%. The correction ratio of −100% indicates driving with a blur correction amount that causes a blur of the same amount as the image blur caused due to the hand shake in the same direction as the direction of the image blur. In other words, the correction ratio of −100% indicates driving with a blur correction amount for amplifying the image blur caused due to the hand shake to be doubled.

The interval "B" is an interval from an end point of the interval "A" to a point where the blur correction amount for correcting the amount of the generated blur exceeds the length of the movable range of the OIS. The interval "B" is an interval in which the correction ratio for the OIS and the reverse correction amount for the IBIS gradually decrease and the absolute value of the correction ratio for the OIS and the absolute value of the correction ratio for the IBIS gradually decrease. In the example illustrated in FIG. 4, at the boundary point between the interval "A" and the interval "B", the correction ratio for the OIS is 200% and the correction ratio for the IBIS is −100%. Control processing is performed such that the absolute value of the correction ratio monotonously decreases from the boundary point between the interval "A" and the interval "B" to the boundary point between the interval "B" and the interval "C", and the correction ratio for the OIS shifts from 200% to 100% and the correction ratio for the IBIS shifts from −100% to 0%. In this case, control processing is performed such that the sum of the correction ratio for the OIS and the correction ratio for the IBIS reaches 100%, thereby making it possible to fully correct the blur.

In the interval "C", the OIS cannot perform further blur correction, and thus the IBIS performs blur correction for correcting the amount of blur that has not been corrected. During this period, the blur correction amount for the OIS is constant, and only the blur correction amount for the IBIS increases. Accordingly, in the interval "C", if the correction ratios between the OIS and the IBIS are not constant and the blur amount is large, the correction ratio varies such that a correction ratio (β) for the IBIS increases and a correction ratio(α) for the OIS decreases. Also, in this interval, the blur can be fully corrected by controlling the sum of the correction ratio for the OIS and the correction ratio for the IBIS to reach 100%.

The second cooperation method illustrated in FIG. 4 can reduce the image blur in an image peripheral portion as compared with the first cooperation method. If a moving image is captured by a user carrying the camera body 100, a large blur occurs in the camera body 100 due to, for example, an impact of landing of the user. In this case, the image blur occurring in the camera body 100 is corrected by the OIS and the IBIS. However, in the first cooperation method, an optimum image blur correction amount in an image central portion with a low image height is different from an optimum image blur correction amount in the image peripheral portion with a high image height. Accordingly, if optimum correction processing is performed on the image blur in the image central portion, the image blur in the image peripheral portion may be noticeable. Such an image blur is noticeable, particularly, when an image is captured with a wide angle, or when a moving image is captured.

The second cooperation method can reduce the image blur in the image peripheral portion as described above.

The camera control method determination unit 166 determines which one of the first cooperation method and the second cooperation method described above with reference to FIGS. 3 and 4 is used to control the OIS and the IBIS. Three or more cooperation methods may be used, and the camera control method determination unit 166 may select the cooperation method from among the three or more cooperation methods.

The description of the image blur correction control unit 103 in the camera body 100 with reference to FIG. 2 is continued. A camera ratio calculation unit (camera ratio integration unit) 163 obtains a correction ratio for the camera body 100 when the sum of the blur correction amount in the camera body 100 and the blur correction amount in the interchangeable lens 200 is 100%, and calculates a second correction amount by multiplying the obtained correction ratio by a first correction amount calculated by the camera blur correction amount calculation unit 162. The correction ratio is obtained based on the cooperation control method (first cooperation method or second cooperation method). In the case of using the second cooperation method, the correction ratio is obtained also based on data representing a relationship between the blur amount and the ratio as illustrated in the graph of FIG. 4, and the detected blur amount. The first correction amount corresponds to the total correction amount of the correction amount in the camera body 100 (the IBIS) and the correction amount in the interchangeable lens 200 (the OIS). Accordingly, the second correction amount for blur correction in the camera body 100 is calculated by multiplying the first correction amount by the correction ratio in the camera body 100.

If a target position of the image sensor 101 corresponding to the second correction amount exceeds a driving limit, a camera driving range limiting unit 164 performs limiting processing and adjusts the correction amount so as not to exceed the driving limit. An output from the camera driving range limiting unit 164 corresponds to a final target correction amount for the IBIS.

A camera feedback control unit 165 performs feedback control using the current position obtained by the image sensor position detection unit 132 so that the image sensor 101 can follow the target position corresponding to the target correction amount, and causes the shift mechanism 101a to drive the image sensor 101 to thereby perform image stabilization control. In the present exemplary embodiment, the camera feedback control unit 165 performs proportional (P), integral (I), and derivative (D) control based on the current position and the target correction amount. However, the feedback control method is not limited to the PID control, but instead P-control, PI-control, and PD-control may be used.

If the camera control method determination unit 166 has selected the second cooperation method, a control interval determination unit 170 determines the control interval illustrated in FIG. 4 in which the correction control is currently performed based on the current blur amount (output from the camera integration unit 161). The camera ratio integration unit 163 also determines the interval in which the correction control is currently performed based on the blur amount and obtains the correction ratio, and thus may obtain the determination result. On the other hand, the determination result from the control interval determination unit 170 may be output to the camera ratio integration unit 163, and the camera ratio integration unit 163 may obtain the ratio using the determination result.

In the case of performing the image blur correction using the OIS and the IBIS by the second cooperation method, a correction strength calculation unit 171 calculates the strength of the image blur correction based on the determination result from the control interval determination unit 170 and the position of the image blur correction lens 204 or the image sensor 101, thereby determining a blur correction strength.

A higher image blur correction strength indicates that the detected blur can be more effectively corrected, and a lower image blur correction strength indicates that the detected blur can be less effectively corrected. The strength of the image blur correction can be changed by changing a cutoff frequency of the integration LPF, changing a cutoff frequency of the band-pass filter used for correction amount calculation, or changing a correction gain for an output of the integration LPF. This processing will be described in detail below, assuming that, if a large blur occurs, for example, during a panning operation, and the image blur correction lens 204 or the image sensor 101 is located near the end of the movable range, a smaller strength than that when the image blur correction lens 204 or the image sensor 101 is not located near the end of the movable range is calculated. For example, the strength may be continuously decreased as the distance from the end of the movable range of the image blur correction lens 204 or the image sensor 101 decreases. Further, if the distance from the end of the movable range of the image blur correction lens 204 or the image sensor 101 is more than or equal to a threshold, a strength $\gamma$ may be set, and if the distance is less than the threshold, a strength $\omega$ may be set ($\gamma>\omega$). Thus, even if a large hand shake is detected, a phenomenon in which the image blur correction lens 204 or the image sensor 101 sticks to the end of the movable range and further blur correction cannot be effectively performed can be prevented.

A configuration example of the image blur correction control unit 224 in the interchangeable lens 200 will be described. The image blur correction control unit 224 in the interchangeable lens 200 receives an input of the blur angular velocity detection result as the shake detection signal from the shake detection unit 228 in the interchangeable lens 200. A lens integration unit 251 in the image blur correction control unit 224 performs integration processing on the input blur angular velocity, thereby converting the blur angular velocity into a blur angle. In the present exemplary embodiment, the integration LPF is also used for the lens integration unit 251.

A lens shake correction amount calculation unit 252 calculates the correction amount for cancelling the blur angle in consideration of the frequency band of the converted blur angle and the drivable range of the interchangeable lens 200. Specific examples of the processing include band-pass filter processing for extracting only a specific frequency band to be subjected to the blur correction on the input blur angle signal.

A lens control method determination unit 256 determines which one of the first cooperation method and the second cooperation method is used for the cooperation control by the IBIS and the OIS, like in the camera control method determination unit 166.

As a determination method, like in the camera control method determination unit 166, if both the camera body 100 and the interchangeable lens 200 are compatible with the second cooperation method, the second cooperation method is selected.

The lens control method determination unit 256 may obtain the determination result from the camera control method determination unit 166, instead of making the determination by the lens control method determination unit 256. Alternatively, in place of the camera control method determination unit 166, the lens control method determination unit 256 may determine the cooperation method and transmit the determination result to the camera body 100.

A lens ratio calculation unit 253 obtains the correction ratio for the interchangeable lens 200 when the sum of the blur correction amount in the camera body 100 and the blur correction amount in the interchangeable lens 200 is 100%, and calculates a fourth correction amount by multiplying the obtained correction ratio by a third correction amount calculated by the lens shake correction amount calculation unit 252. Like in the camera ratio calculation unit 163, the correction ratio is obtained based on the cooperation method. If the second cooperation method is used as the cooperation method, the correction ratio is obtained based on data representing a relationship between the blur amount and the ratio and the detected blur amount. The correction ratio for the interchangeable lens 200 may be obtained such that the camera ratio calculation unit 163 obtains the correction ratio for the interchangeable lens 200 and transmits the obtained correction ratio to the lens ratio calculation unit 253 and the lens ratio calculation unit 253 receives the correction ratio. Alternatively, the camera ratio calculation unit 163 may transmit the correction ratio for the camera body 100 to the lens ratio calculation unit 253, and the correction ratio for the interchangeable lens 200 may be obtained based on the correction ratio for the camera body 100 received by the lens ratio calculation unit 253. More alternatively, the functions of the lens ratio calculation unit 253 and the camera ratio calculation unit 163 may be reversed so that the lens ratio calculation unit 253 can obtain the correction ratio for each of the camera body 100 and the interchangeable lens 200, and may transmit the obtained correction ratio for the camera body 100 to the camera body 100 or transmit the obtained correction ratio for the interchangeable lens 200 to the camera body 100.

In a case where the target position of the image blur correction lens 204 corresponding to the fourth image blur correction amount exceeds the driving limit, a lens driving range limiting unit 254 performs limiting processing and adjusts the correction amount so as not to exceed the driving limit. An output from the lens driving correction limiting unit 254 corresponds to a final target correction amount for the OIS. A lens feedback control unit 255 performs feedback control using the current position obtained by the lens position detection unit 234 so that the image sensor 101 can follow the target position corresponding to the target correction amount, and causes the shift mechanism 204a to drive the OIS to thereby perform image stabilization control.

Processing to be performed by the correction strength calculation unit 171 will be described. As described above, the use of the second control method makes it possible to reduce the image blur in the image peripheral portion as compared with the first control method. However, if the image blur correction control is performed by the second cooperation method, the correction control cannot be appropriately performed upon occurrence of a large hand shake, like in a case where the imaging apparatus is caused to perform a panning operation or the like. In a typical image stabilization control operation to be performed when a large hand shake is detected, the strength of the image blur correction is decreased as the position of an image blur correction member (image blur correction lens 204 or image sensor 101) approaches the end of the movable range, thereby preventing the correction position of the image blur correction member from approaching a correction movable end. This control operation is hereinafter referred to as a panning control operation. If the panning control operation is not performed, a state where the position of the image blur correction member is located near the end of the movable range continues during the panning operation of the imaging apparatus, which leads to a decrease in the correctable amount from this state. As a result, the strength of the image blur correction decreases after completion of the panning operation, and thus the image blur is noticeable, which leads to deterioration in the quality of a captured video image.

In the case of performing the panning control operation during hand shake correction by the first cooperation method, the OIS and the IBIS correct a relative movement between the object image and the image plane of image sensor 101 in the same direction depending on the correction ratio. Accordingly, the panning control operation may be performed based on the position of the image blur correction lens 204, or may be performed based on the position of the image sensor 101. On the other hand, in second cooperation method, as described above, Overcorrection control is performed by the OIS and reverse correction control is performed by the IBIS. For example, in the interval "B" illustrated in FIG. 4, the IBIS performs image blur correction by decreasing the reverse correction amount along with an increase in the blur amount. Accordingly, if the panning control operation is performed depending on the correction position of the IBIS, the correction amount of the IBIS decreases as the reverse correction amount of the IBIS becomes large and the position of the image sensor 101 is located closer to the movable end (that is, closer to the interval "A"), which makes it difficult to appropriately perform the panning control operation. Thus, it is difficult to appropriately perform the correction control by the second cooperation method, without determining which of the positions of the image sensor 101 and the image blur correction lens 204 is referenced to perform the panning control operation in the second cooperation method.

According to the present exemplary embodiment, in panning control operation by the second control method, the correction member, the position of which is referenced during the panning control operation, is change depending on the correction control interval (intervals "A" to "C") illustrated in FIG. 4. Specifically, the correction strength calculation unit 171 obtains the determination result from the control interval determination unit 170. Upon obtaining the determination result corresponding to the interval "A" and the interval "B" illustrated in FIG. 4 and indicating that the OIS and the IBIS are currently controlled by the first control method in which reverse correction is performed, the correction strength calculation unit 171 calculates the correction strength based on the position of the image blur correction lens and performs the panning control operation. Upon obtaining the determination result indicating that the correction control is currently performed in the interval "A" or the interval "B" from the control interval determination unit 170, the correction strength calculation unit 171 obtains positional information about the image blur correction lens 204 from the lens information management unit 129, and calculates the correction strength.

On the other hand, upon obtaining the determination result corresponding to the interval "C" illustrated in FIG. 4 and indicating that the OIS and the IBIS are currently controlled by the second control method from the control interval determination unit 170, the correction strength calculation unit 171 performs the panning control operation based on the position of the image sensor 101. Upon obtaining the determination result indicating that the correction control is currently performed in the interval "C" from the camera control interval determination unit 170, the correction strength calculation unit 171 obtains positional information about the image sensor 101 from the image sensor position detection unit 132 and calculates the correction strength.

A known panning control method can be used as the method of calculating the correction strength by the correction strength calculation unit 171, and thus the detailed description thereof is omitted. For example, the correction strength is calculated such that the correction strength decreases as the distance between the correction member, the position of which is referenced, and the end of the movable range decreases.

A distance between an end of the movable range and the correction member, or a distance between the center position of the movable range and the correction member may be used as the distance for calculation. In this case, if the distance between the correction member and the end of the movable range exceeds a predetermined value, the correction strength may be set to a constant value, and if the distance is less than the predetermined value, a calculation method for decreasing the correction strength as the distance decreases may be used. The correction strength may be changed stepwise, instead of being changed continuously. For example, if the distance between the correction member and the end of the movable range exceeds a first predetermined value, a first strength may be set, if the distance is less than the first predetermined value and more than a second predetermined value, a second strength may be set, and if the distance is less than the second predetermined value and more than a third predetermined value, a third strength may be set (first strength>second strength>third strength).

The correction strength may be changed by narrowing the passband of a filter used for calculating the correction amount, or by changing a gain to be multiplied by the correction amount. The present exemplary embodiment illustrates an example where the correction strength is changed by changing the cutoff frequency of the integration LPF of each of the camera integration unit 161 and the lens integration unit 251. The cutoff frequency of the integration LPF calculated by the correction strength calculation unit 171 is transmitted to the lens communication unit 229 from the camera communication unit 106, and is then transmitted to the camera information management unit 237. The lens integration unit 251 obtains information about the cutoff frequency of the integration LPF from the camera information management unit 237.

As the cutoff frequency of the integration LPF increases, an angular blur amount as an output value from the integration LPF decreases. Accordingly, the image blur correction strength can be decreased by increasing the cutoff frequency as the correction member is located closer to the movable end.

Figure 5A:
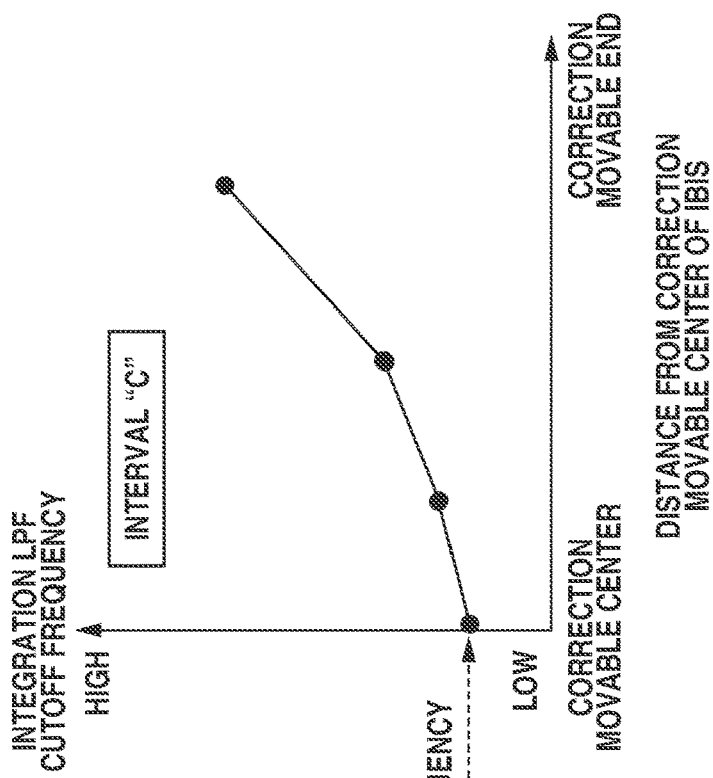
FIG. 5A is a graph illustrating a relationship between a position of a correction member and a cutoff frequency of an integration low-pass filter (LPF) according to the first exemplary embodiment.
Figure 5B:
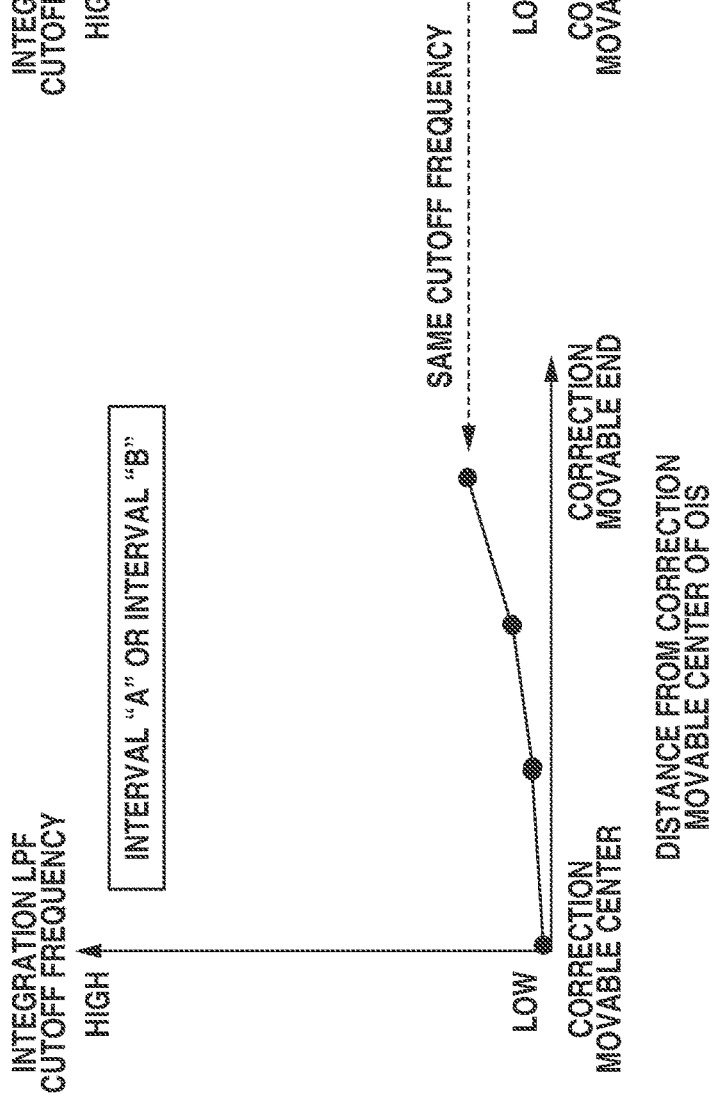
FIG. 5B is a graph illustrating a relationship between the position of the correction member and the cutoff frequency of the integration LPF according to the first exemplary embodiment.

FIGS. 5A and 5B are graphs each illustrating a relationship between the position of the correction member and the cutoff frequency of the integration LPF according to the present exemplary embodiment. In the graphs of FIGS. 5A and 5B, the horizontal axis represents the distance from the movable center of the correction member to the position of the correction member, and the vertical axis represents the cutoff frequency of the integration LPF. The graph of FIG. 5A illustrates the interval "A" and the interval "B", and represents a relationship between the position of the correction member (image blur correction lens 204 in this case) and the cutoff frequency when the cutoff frequency is determined based on positional information about the image blur correction lens 204. The graph of FIG. 5B illustrates the interval "C", and represents a relationship between the position of the correction member (image sensor 101 in this case) and the cutoff frequency when the cutoff frequency is determined based on correction positional information about the image sensor 101. In each of the intervals "A to "C" illustrated in FIGS. 5A and 5B, the cutoff frequency tends to increase as the position of the correction member is located closer to the end of the movable range. At the boundary portion between the interval "B" and the interval "C", the cutoff frequency of the integration LPF is set to the same value so that the cutoff frequency can continuously shift to prevent an unnatural video image from being formed in a transition from the interval "B" to the interval "C" during image capturing. The use of the above-described method makes it possible to appropriately perform the panning control operation also in the second cooperation method.

Figure 6:
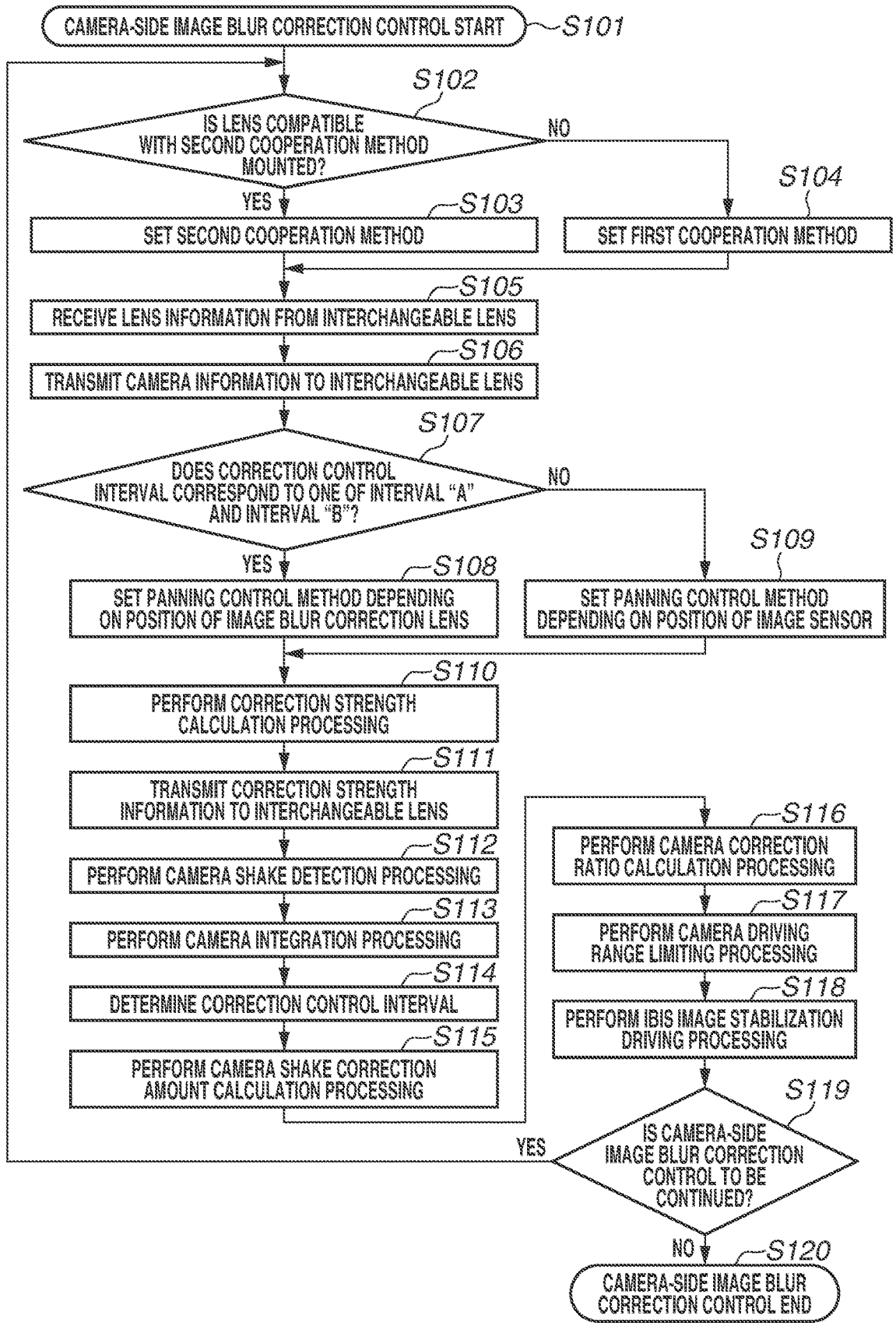
FIG. 6 is a flowchart illustrating processing to be performed by a camera body according to the first exemplary embodiment.
Figure 7:
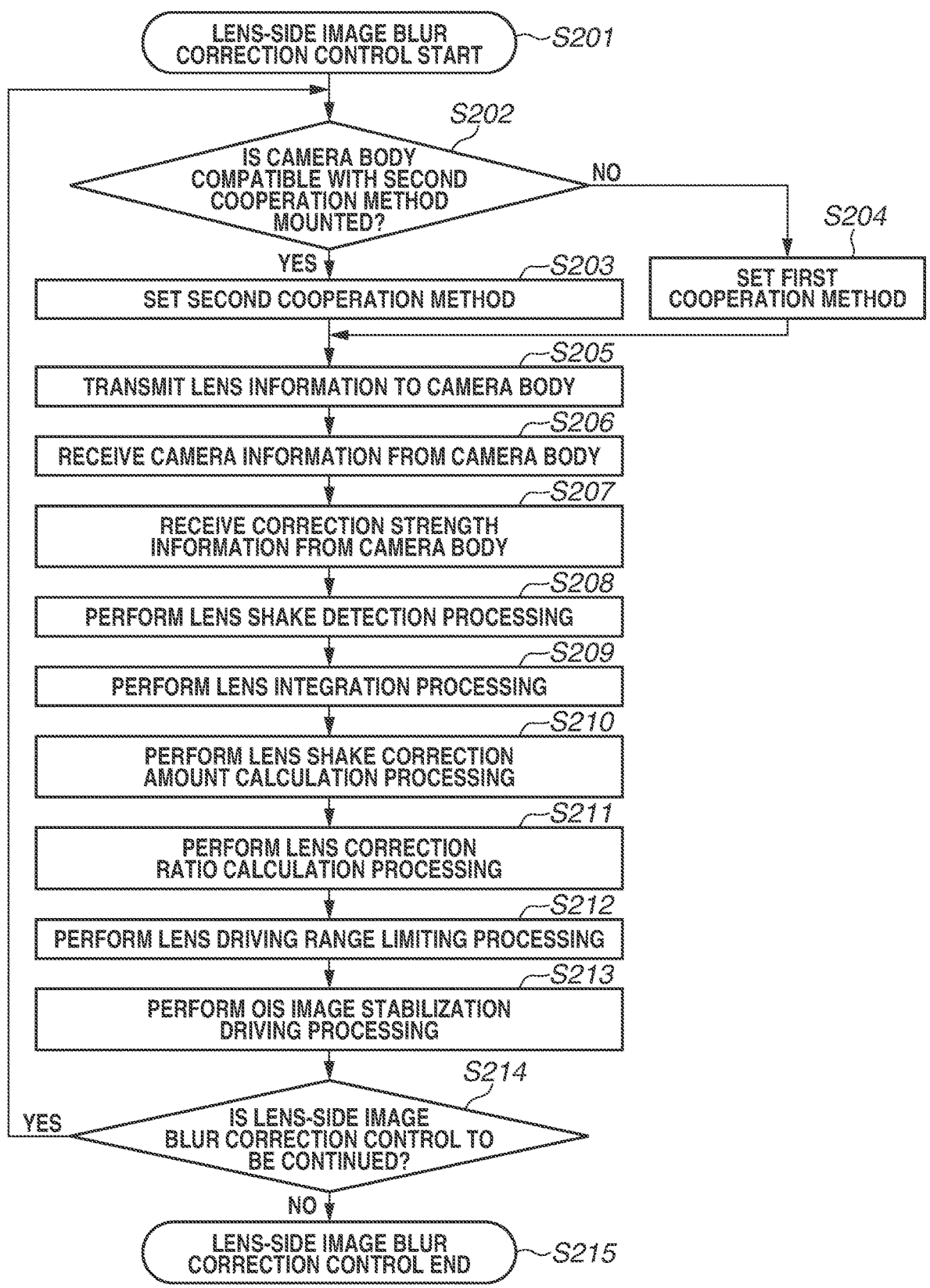
FIG. 7 is a flowchart illustrating processing to be performed by an interchangeable lens according to the first exemplary embodiment.

Image blur correction processing performed in the present exemplary embodiment will be described with reference to flowcharts of FIGS. 6 and 7. FIG. 6 is a flowchart illustrating image blur correction processing to be performed by the camera body 100 according to the present exemplary embodiment. FIG. 7 is a flowchart illustrating image blur correction processing to be performed by the interchangeable lens 200 according to the present exemplary embodiment.

Image blur correction processing to be performed by the camera body 100 will be described with reference to FIG. 6. This processing is performed by the image blur correction control unit 103, unless otherwise noted. First, in step S101, the image blur correction control unit 103 starts image blur correction control processing in response to an instruction from the camera microcomputer 102.

In step S102, the camera control method determination unit 166 in the image blur correction control unit 103 determines whether the interchangeable lens 200 mounted on the camera body 100 is compatible with the second cooperation method based on information indicating the model number of the interchangeable lens 200 or the like. If the mounted interchangeable lens 200 is compatible with the second cooperation method (YES in step S102), the processing proceeds to step S103. In step S103, it is determined that the following image blur correction control is performed using the second cooperation method, and the second cooperation method is set as the cooperation method for the image blur correction control. If the mounted interchangeable lens 200 is not compatible with the second cooperation method (NO in step S102), the processing proceeds to step S104. In step S104, it is determined that the following image blur correction control is performed using the first cooperation method, and the first cooperation method is set as the cooperation method for the image blur correction control. When the processing proceeds to step S103 or step S104, the camera control method determination unit 166 outputs the determination result to the camera ratio integration unit 163, the camera driving range limiting unit 164, and the control interval determination unit 170.

After the cooperation method for the image blur correction control is set, the processing proceeds to step S105. In step S105, the camera microcomputer 102 obtains lens information from the interchangeable lens 200 via the camera communication unit 106, and stores the lens information in the lens information management unit 129. The lens information to be stored is described above, and thus the description thereof is omitted.

Next, in step S106, the camera microcomputer 102 transmits camera information to the interchangeable lens 200 via the camera communication unit 106. The camera information to be transmitted is described above, and thus the description thereof is omitted.

In step S107, the control interval determination unit 170 determines whether the control interval in the previous cycle corresponds to the interval "A" or the interval "B" illustrated in FIG. 4. In other words, in this determination process, it is determined whether the current position of each of the OIS and the IBIS corresponds to the position where the reverse correction for moving relative positions of the object image and the image sensor 101 in opposite directions in the OIS and the IBIS is performed. This determination process is carried out by referring to the result in step S115 in the previous blur correction cycle. If it is determined that the current position corresponds to the interval "A" or the interval "B" (YES in step S107), the processing proceeds to step S108. If it is determined that the current position does not correspond to the interval "A" and the interval "B", or if it is determined that the current position corresponds to the interval "C" in the present exemplary embodiment (NO in step S107), the processing proceeds to step S109.

In step S108, the correction strength calculation unit 171 is set to calculate the correction strength based on the position of the image blur correction lens 204. On the other hand, in step S109, the correction strength calculation unit 171 is set to calculate the correction strength based on the position of the image sensor 101. Which one of the correction members is to be referenced during the calculation of the correction strength is set in step S108 or step S109, and then the processing proceeds to step S110.

In step S110, the correction strength calculation unit 171 calculates the strength of the image blur correction. The calculation method is described above in the description of the correction strength calculation unit 171. If the processing proceeds to step S110 via step S108, the positional information about the image blur correction lens 204 that is obtained through communication between the camera body 100 and the interchangeable lens 200 and is stored in the lens information management unit 129 is obtained. Further, the cutoff frequency is calculated such that the cutoff frequency of the integration LPF decreases as the position of the image blur correction lens 204 approaches the end of the movable range. If the processing proceeds to step S110 via step S109, the positional information about the image sensor 101 is obtained from the image sensor position detection unit 132, and the cutoff frequency is calculated such that the cutoff frequency of the integration LPF decreases as the position of the image sensor 101 approaches the end of the movable range. Instead of calculating the cutoff frequency, the cutoff frequency may be obtained by referring to information corresponding to the graphs of FIGS. 5A and 5B.

In step S111, the correction strength calculation unit 171 transmits information about the cutoff frequency calculated in step S110 to the interchangeable lens 200 via the camera communication unit 106.

In step S112, the image blur correction control unit 103 obtains the detection result from the camera shake detection unit 105. The obtained shake detection result is input to the camera integration unit 161.

In step S113, the camera integration unit 161 performs pseudo integration processing by performing LPF processing on the received detection result from the camera shake detection unit 105. The cutoff frequency calculated in step S110 is set as the cutoff frequency for LPF processing used in this step. Thus, when the image blur control is performed by the first method in which reverse correction is performed (corresponding to the interval "A" or the interval "B"), a shake amount in which the correction strength calculated based on the position of the image blur correction lens 204 is reflected is calculated. On the other hand, in the second method (corresponding to the interval "C") in which reverse correction is not performed because the correction amount is insufficient, a shake amount in which the correction strength calculated based on the position of the image sensor 101 is reflected is calculated.

In step S114, the camera blur correction amount calculation unit 162 calculates the blur correction amount based on the shake amount received from the camera integration unit 161. The blur correction amount calculation method is described above, and thus the description thereof is omitted.

In step S115, the control interval determination unit 170 determines whether the current control interval corresponds to the interval "A" or the interval "B" illustrated in FIG. 4 in which reverse correction is performed by the OIS and the IBIS, and outputs the determination result to the camera ratio integration unit 163. This determination is made based on the shake amount as described above.

In step S116, the camera ratio integration unit 163 obtains the correction ratio for the camera body 100 based on the result of determination by the camera control method determination unit 166. Further, the camera ratio integration unit 163 multiplies the obtained correction ratio by the blur correction amount input from the camera blur correction amount calculation unit 162, thereby calculating the blur correction amount for the camera body 100. The method of obtaining the correction ratio is described above, and thus the detailed description thereof is omitted. In the case of using the second control method, the correction ratio corresponding to any one of the control intervals (intervals "A" to "C") is obtained.

In step S117, the camera driving range limiting unit 164 performs limiting processing in a case where the target position of the image sensor 101 corresponding to the calculated blur correction amount for the camera body 100 exceeds the limit of the driving range of the image sensor 101, and calculates the final target correction amount for the IBIS.

In step S118, the camera feedback control unit 165 controls the shift mechanism 101a of the image sensor 101 based on the position of the image sensor 101 detected by the image sensor position detection unit 132 and the target correction amount in the camera body 100 input from the camera driving range limiting unit 164. Thus, the camera feedback control unit 165 controls the position of the image sensor 101 to perform the IBIS driving processing.

In step S119, the image blur correction control unit 103 in the camera body 100 determines whether to continue the image blur correction control in the camera body 100. If it is determined that the image blur correction control in the camera body 100 is to be continued (YES in step S119), the processing returns to step S102. Assuming that the mounted interchangeable lens 200 is not changed, the processing may be returned to step S105. In this case, if it is detected that the mounted interchangeable lens 200 is changed, the processing may be returned to step S102. This processing is terminated if it is determined that the image blur correction is not continuously performed, for example, when a user has turned off an image blur correction function in the camera body 100, or when the camera body 100 has shifted to a reproduction mode.

Image blur correction processing to be performed by the interchangeable lens 200 will be described with reference to FIG. 7. This processing is performed by the image blur correction control unit 224, unless otherwise noted. First, in step S201, the image blur correction control unit 224 starts the image blur correction control processing in response to an instruction from the lens microcomputer 226.

In step S202, the lens control method determination unit 256 in the image blur correction control unit 224 determines whether the camera body 100 on which the interchangeable lens 200 is mounted is compatible with the second cooperation method based on information indicating the model number of the camera body 100 on which the interchangeable lens 200 is mounted or the like. If the camera body 100 on which the interchangeable lens 200 is mounted is compatible with the second cooperation method (YES in step S202), the processing proceeds to step S203. In step S203, it is determined that the following image blur correction control is performed using the second cooperation method, and the second cooperation method is set as the cooperation method for the image blur correction control. If the camera body 100 on which the interchangeable lens 200 is mounted is not compatible with the second cooperation method (NO in step S202), the processing proceeds to step S204. In step S204, it is determined that the following image blur correction control is performed using the first cooperation method, and the first cooperation method is set as the cooperation method for the image blur correction control.

When the processing proceeds to step S203 or step S204, the lens control method determination unit 256 outputs the determination result to each of the lens ratio integration unit 253 and the lens driving range limiting unit 254. Instead of determining whether the camera body 100 is compatible with the second cooperation method using the model number of the camera body 100, the lens control method determination unit 256 may obtain from the camera body 100 the result of determination as to by which of the first cooperation method and the second cooperation method image blur correction control is performed, and may set the cooperation method based on the obtained determination result.

After the cooperation method for the image blur correction control is set, the processing proceeds to step S205. In step S205, the lens microcomputer 226 transmits lens information to the camera body 100 via the lens communication unit 229. This corresponds to step S105 illustrated in FIG. 6.

Next, in step S206, the lens microcomputer 226 obtains camera information from the camera body 100 via the lens communication unit 229, and stores the camera information in the camera information management unit 237. This step corresponds to step S106 illustrated in FIG. 6.

In step S207, the image blur correction control unit 224 obtains information about the correction strength calculated by the correction strength calculation unit 171 from the camera body 100 via the lens communication unit 229, and also stores the information about the correction strength in the camera information management unit 237. This step may be carried out simultaneously with step S206.

In step S208, the image blur correction control unit 224 obtains the detection result from the lens shake detection unit 228. The obtained shake detection result is input to the lens integration unit 251.

In step S209, the lens integration unit 251 performs LPF processing on the input detection result from the lens shake detection unit 228, thereby performing pseudo integration processing. The cutoff frequency for LPF processing used in this step is calculated by the camera body 100 in step S110 and is obtained from the camera body 100 in step S207. Thus, when the image blur control is performed by the first method in which reverse correction is performed (corresponding to the interval "A" or the interval "B"), a shake amount in which the correction strength calculated based on the position of the image blur correction lens 204 is reflected is calculated. On the other hand, in the second method in which reverse correction is not performed because the correction amount is insufficient (corresponding to the interval "C"), a shake amount in which the correction strength calculated based on the position of the image sensor 101 is reflected is calculated.

In step S210, the lens shake correction amount calculation unit 252 calculates the blur correction amount based on the shake amount received from the lens integration unit 251. The blur correction amount calculation is described in detail above, and thus the description thereof is omitted.

In step S211, the lens ratio integration unit 163 obtains the correction ratio for the interchangeable lens 200 based on the result of determination by the lens control method determination unit 256. Further, the lens ratio integration unit 163 calculates the blur correction amount for the interchangeable lens 200 by multiplying the obtained correction ratio by the blur correction amount input from the lens shake correction amount calculation unit 252. The correction ratio obtaining method is described above, and thus the detailed description thereof is omitted. In the case of using the second control method, the correction ratio corresponding to any one of the control intervals (any one of the intervals "A" to "C") is obtained. Accordingly, the determination result from the control interval determination unit 170 obtained in step S206 is referenced.

In step S212, if the target position of the image blur correction lens 204 corresponding to the calculated blur correction amount for the interchangeable lens 200 exceeds the limit of the driving range of the image blur correction lens 204, the lens driving range limiting unit 254 performs limiting processing.

In step S213, the lens feedback control unit 255 controls the shift mechanism 204a of the image blur correction lens 204 based on the position of the image blur correction lens 204 detected by the lens position detection unit 234 and the target correction amount for the interchangeable lens 200 input from the lens driving range limiting unit 254. Thus, the lens feedback control unit 255 controls the position of the image blur correction lens 204, and performs the OIS driving processing.

In step S214, the image blur correction control unit 224 in the interchangeable lens 200 determines whether to continue the image blur correction control in the interchangeable lens 200. If it is determined that the image blur correction control in the interchangeable lens 200 is to be continued (YES in step S214), the processing returns to step S202. The processing may be returned to step S205, assuming that the camera body 100 on which the interchangeable lens 200 is mounted is not changed. In this case, if it is detected that the mounted interchangeable lens 200 is changed, the processing may be returned to step S202. This processing is terminated if it is determined that the image blur correction is not to be continued, for example, when the user has turned off the image blur correction function in the interchangeable lens 200.

In the present exemplary embodiment, the correction strength calculation unit 171 is installed on the camera body 100, but instead the correction strength calculation unit 171 may be installed on the interchangeable lens 200 and the correction strength calculation unit 171 may perform the panning control operation by transmitting the calculated correction strength to the camera body 100. Alternatively, the correction strength calculation unit 171 may be installed on each of the camera body 100 and the interchangeable lens 200, and each of the camera body 100 and the interchangeable lens 200 may calculate the correction strength and perform the panning control operation.

In the present exemplary embodiment, the cutoff frequency of the integration LPF is used for adjustment of the correction amount based on the correction strength determined by the correction strength calculation unit 171. However, how to reflect the correction strength is not limited to this example. For example, a correction gain may be calculated based on the determined correction strength and, for example, the correction strength may be adjusted by adding the correction gain in each of a correction amount calculation processing system for the camera body 100 and a correction amount calculation processing system for the interchangeable lens 200.

Further, for example, the correction strength may be adjusted by changing the cutoff frequency of the band-pass filter used for the camera blur correction amount calculation unit 162 and the lens shake correction amount calculation unit 252.

While the present exemplary embodiment illustrates a configuration in which the target correction amount for the IBIS is calculated by the camera body 100 and the target correction amount for the OIS is calculated by the interchangeable lens 200, the target correction amount for the IBIS and the target correction amount for the OIS may be calculated by one of the camera body 100 and the interchangeable lens 200.

In the present exemplary embodiment, the target correction amount is calculated based on the shake amount calculated by performing pseudo integration processing on the angular velocity detected by the angular velocity sensor. However, the target correction amount calculation method is not limited to this method. For example, the target correction amount may be calculated based on an acceleration detected by an acceleration sensor, or a motion vector calculated based on an image, or the shake amount may be calculated using these pieces of information.

The present exemplary embodiment described above illustrates a configuration of a camera system (imaging system) composed of the camera body 100 and the interchangeable lens 200 that is detachably mounted on the camera body 100. However, the present exemplary embodiment can also be applied to a lens-integrated camera, as long as the camera includes the OIS and the IBIS functions (for performing image blur correction by moving the image sensor). The present exemplary embodiment can also be applied to various electronic devices, such as a smartphone, a tablet, a wearable device, and a drone, as long as the electronic devices include a camera unit including the OIS and the IBIS functions. Furthermore, for example, a part or all of the processing performed by the image blur correction control unit 103 in the camera body 100 and the image blur correction control unit 224 in the interchangeable lens 200 according to the present exemplary embodiment may be performed by an external device or as a cloud service.

According to an exemplary embodiment of the disclosure, it is possible to provide an image blur correction apparatus for appropriately controlling the image blur correction unit to prevent an unnatural video image from being formed also during a panning operation, while reducing an image blur in the image peripheral portion that occurs when the user captures the video image while carrying the imaging apparatus.

Other Exemplary Embodiments

The disclosure can also be implemented by processing in which a program for implementing one or more functions according to the above-described exemplary embodiments is supplied to a system or apparatus via a network or storage medium, and one or more processors in a computer of the system or apparatus read out and execute the program.

The disclosure can also be implemented by a circuit (e.g., an application-specific integrated circuit (ASIC)) for implementing one or more functions according to the exemplary embodiments.

The disclosure is not limited to the above-described exemplary embodiments, and various modifications and changes can be made without departing from the spirit and scope of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-139737, filed Sep. 2, 2022, which is hereby incorporated by reference herein in its entirety.

What is claimed is:

1. An apparatus for controlling a blur correction by driving a first correction unit and a second correction unit, the first correction unit being configured to change a direction of an optical axis of an optical system by moving an optical element included in the optical system, the second correction unit being configured to move a sensor in a direction intersecting the optical axis, the sensor being configured to capture an object image formed by light having passed through the optical system,
the apparatus comprising at least one processor which functions as:
a first obtaining unit configured to obtain positional information about the optical element;
a second obtaining unit configured to obtain positional information about the sensor;
a determination unit configured to determine a strength of the blur correction;
a calculation unit configured to calculate a correction amount of at least one of the first correction unit and the second correction unit based on the determined strength of the blur correction and a shake amount of an imaging apparatus; and
a control unit configured to control the first correction unit and the second correction unit by a plurality of methods including at least a first method and a second method,
wherein in a case where the control unit controls the first correction unit and the second correction unit by the first method, the determination unit determines the strength of the blur correction based on the positional information about the optical element, and in a case where the control unit controls the first correction unit and the second correction unit by the second method, the determination unit determines the strength of the blur correction based on the positional information about the sensor.

2. The apparatus according to claim 1,
wherein in a case where the shake amount exceeds a predetermined value from a value less than or equal to the predetermined value, the control unit switches the method from the first method to the second method.

3. The apparatus according to claim 1,
wherein the first method is a method for moving the sensor in the same direction as a direction in which the object image and the sensor move along with a shake of the imaging apparatus, and
wherein the second method is a method for moving the sensor in a direction in which the movement of each of the object image and the sensor along with a shake of the imaging apparatus is decreased.

4. The apparatus according to claim 1,
wherein the first method is a method for moving the optical element such that a position of the object image is moved to a greater extent than a movement amount of each of the object image and the sensor along with a shake of the imaging apparatus, and
wherein the second method is a method for moving the optical element such that the position of the object image is moved to a smaller extent than the movement amount of each of the object image and the sensor along with the shake of the imaging apparatus.

5. The apparatus according to claim 1,
wherein the first method is a method for moving the optical element excessively with respect to a shake of the imaging apparatus and moving the sensor to cancel out an excessive movement of the optical element, and
wherein the second method is a method for moving each of the optical element and the sensor such that each of a movement amount of the sensor and the object image due to a movement of the optical element and a movement amount of the sensor and the object image due to a movement of the sensor is smaller than a movement amount of the sensor and the object image along with the shake of the imaging apparatus.

6. The apparatus according to claim 1, wherein in a case where the unit controls the first correction unit and the second correction unit by the first method, the determination unit determines the strength of the blur correction such that the strength of the blur correction when the optical element is located at a second position is smaller than the strength of the blur correction when the optical element is located at a first position, a distance from a center of a movable range of the optical element at the second position being longer than a distance from the center of the movable range of the optical element at the first position.

7. The apparatus according to claim 1, wherein in a case where the unit controls the first correction unit and the second correction unit by the second method, the determination unit determines the strength of the blur correction such that the strength of the blur correction when the sensor is located at a fourth position is smaller than the strength of the blur correction when the sensor is located at a third position, a distance from a center of a movable range of the sensor at the fourth position being longer than a distance from the center of the movable range of the sensor at the third position.

8. The apparatus according to claim 1,
wherein the calculation unit calculates the correction amount using a band-pass filter, and
wherein the determination unit determines a correction strength by determining a cutoff frequency of the band-pass filter.

9. The apparatus according to claim 1, wherein the calculation unit calculates the correction amount by performing integration processing on an angular velocity signal from the imaging apparatus, and the determination unit determines a correction strength by determining a cutoff frequency of the integration processing.

10. The apparatus according to claim 1, wherein the determination unit determines a gain, and the calculation unit calculates the correction amount using the gain.

11. An imaging apparatus comprising:
the apparatus according to claim 1;
the sensor; and
the second correction unit,
wherein the calculation unit calculates a correction amount of at least the second correction unit, and
wherein the determined strength of the blur correction is transmitted to a lens apparatus mounted on the imaging apparatus.

12. The imaging apparatus according to claim 11,
wherein it is determined whether the mounted lens apparatus is compatible with a cooperation method for switching between the first method and the second method depending on a shake amount, and
wherein in a case where it is determined that the mounted lens apparatus is not compatible with the cooperation method, the determination unit determines the strength of the blur correction based on a position of the sensor.

13. The imaging apparatus according to claim 11,
wherein it is determined whether the mounted lens apparatus is compatible with a cooperation method for switching between the first method and the second method depending on a shake amount, and
wherein in a case where it is determined that the mounted lens apparatus is not compatible with the cooperation method, the determination unit determines the strength of the blur correction based on a position of the optical element.

14. An imaging apparatus comprising:
the apparatus according to claim 1;
an optical system;
the first correction unit;
the sensor; and
the second correction unit,
wherein the calculation unit calculates the correction amount of the first correction unit and the correction amount of the second correction unit using a first blur correction strength determined by the determination unit.

15. The imaging apparatus according to claim 14, wherein the calculation unit includes:
a first calculation unit configured to calculate the correction amount of the first correction unit; and
a second calculation unit configured to calculate the correction amount of the second correction unit.

16. A lens apparatus comprising:
the apparatus according to claim 1;
an optical system; and
the first correction unit,
wherein the calculation unit calculates a correction amount of at least the first correction unit, and
wherein the strength of the determined blur correction is transmitted to an imaging apparatus on which the lens apparatus is mounted.

17. A method for controlling a blur correction by driving a first correction unit and a second correction unit, the first correction unit being configured to change a direction of an optical axis of an optical system by moving an optical element included in the optical system, the second correction unit being configured to move a sensor in a direction intersecting the optical axis, the sensor being configured to capture an object image formed by light having passed through the optical system,
the method comprising:
determining a strength of the blur correction;
calculating a correction amount of at least one of the first correction unit and the second correction unit based on the determined strength of the blur correction and a shake amount of an imaging apparatus; and
controlling the first correction unit and the second correction unit by a plurality of methods including at least a first method and a second method,
wherein in the determination, in a case where the first correction unit and the second correction unit are controlled by the first method, the strength of the blur correction is determined based on positional information about the optical element, and in a case where the first correction unit and the second correction unit are controlled by the second method, the strength of the blur correction is determined based on positional information about the sensor.

* * * * *